Patented July 11, 1933

1,917,521

UNITED STATES PATENT OFFICE

EDWARD W. HERR, OF FREEPORT, NEW YORK, ASSIGNOR TO DARCO SALES CORPORATION, OF NEW YORK, N. Y., A CORPORATION OF DELAWARE

PROMOTION OF FERMENTATION

No Drawing. Application filed April 2, 1929. Serial No. 352,050.

In the fermentation of sugar containing solutions by the action of yeast the yield and purity of the resulting alcohol is dependent upon a large number of factors, including density of the solution, accumulation of alcohol and carbon dioxide in the solution, possible by-products having a toxic effect on the micro-organisms of the yeast, etc. All of these factors which limit the percentage yield of alcohol in respect to the sugar content of the solution, may be grouped under one general heading. The fermentation is retarded or limited by the development of conditions which interfere with the activity of the micro-organisms.

I have discovered that by adding to the fermentable solution an organic nitrogenous substance and an activated vegetable char as a carrier for said substance, the yield of alcohol may be very material increased and the time of fermentation shortened.

I have also found that the addition of these same materials increases the purity of the product, that is, there is produced a smaller quantity of other alcohols, fusel oil, and such by-products of the fermenting action.

The exact chemical or bio-chemical action which takes place, and therefore the exact cause of the increase yield and purity, is not known with certainty, but I believe that the activated vegetable char acts by reason of its absorptive properties to remove from the solution toxic substances having a deleterious effect upon the micro-organisms and the nitrogenous substance serves at the same time as a food to stimulate the growth and virility of said organisms. Probably the extremely fine dispersion of the nitrogenous substance in the capillaries of the carbon renders it assimilable by the organism whereas in ordinary suspension in liquid without a carrier its effect is not satisfactory.

The nitrogenous substance employed is preferably vegetable protein, although it may be various proteids or other organic nitrogen-bearing compounds. Other carriers for this nitrogenous substance and of a porous or absorptive nature, might be employed, although preferably I employ an activated vegetable char. Experiments indicate that the best results are obtained by the use of an activated vegetable char known in the trade as "Darco" and which is produced from lignite.

The mixture of the organic nitrogenous substance and the carrier may be accomplished in various ways. A solution containing the organic nitrogenous substances may be filtered through a mass of the char, or the char may be mixed in the solution and then removed by the use of a filter press or other apparatus. In either case the substances are absorbed in the pores or adhere to the particles of the char in a state of very fine division. Alternatively I may mix the char and a sufficient amount of solution or suspension of the substance to form a paste or slurry, and if need be the excess liquid may be evaporated to dryness in the presence of the char, whereby the particles of the substance are formed or collected in the pores of the char or on the surface.

By means of my improved material I am able to secure highly efficient fermentation of a molasses solution of very much greater density than is ordinarily considered possible. For instance, I may ferment a molasses solution of 35 Brix density as compared with the ordinary molasses solution which is diluted to 16 to 20 Brix density. I may accomplish this by the addition of about 10 grams of the material per gallon of molasses solution.

The char which acts as a carrier is preferably in a finely subdivided state and is of such specific gravity that the tendency to settle to the bottom of the molasses container is comparatively slight. The evolution of gas during the fermentation is sufficient to keep the material is suspension.

The action of the activated char and the organic nitrogenous substance has a similar effect upon other micro-organisms used for effecting the production of other products by fermentation action. For instance, it may be used to advantage in connection with B. aceti in the fermentation or oxidation of alcohol to vinegar or in the production of butyl alcohol or fusel oil. With the proper bacilli molasses may be fermented to alcohol and alcohol fermented to vinegar in a one step process as distinguished from the ordinary two step process.

Nitrogenous food products may be obtained from a wide variety of sources and may in some cases be employed with a comparatively inert, highly porous carrier. The combination of the absorptive activated vegetable char and the nitrogenous food substance is preferable.

Having thus described my invention, what I claim as new and desire to secure by Letters Patent is:

1. The process of promoting fermentation of a fermentable solution which includes adding thereto an activated vegetable char containing a protein in the pores thereof.

2. The process of accelerating the action and increasing the yield of fermentation by micro-organisms, which includes adding to the fermentation solution an activated vegetable char containing an adsorbed organic nitrogenous food substance for the micro-organisms.

3. The process for the manufacture of alcohol which includes the step of effecting fermentation of a sugar containing solution by micro-organisms in the presence of a vegetable char having adsorbed therein an organic nitrogenous substance.

4. The process of accelerating fermentation which includes adding to the fermentable solution a porous carrier material having a nitrogenous substance adsorbed therein.

5. The process of promoting fermentation of a fermentable solution which includes adding thereto a carrier in finely subdivided state and a protein adsorbed therein.

Signed at New York, in the county of New York, and State of New York, this thirtieth day of March, 1929.

EDWARD W. HERR.